(12) United States Patent
Ku et al.

(10) Patent No.: US 9,927,962 B2
(45) Date of Patent: Mar. 27, 2018

(54) APPARATUS AND METHOD FOR DISPLAYING MENU IN MOBILE DEVICE

(71) Applicant: Samsung Electronics Co., Ltd., Gyeonggi-do (KR)

(72) Inventors: Han-Jun Ku, Gyeonggi-do (KR); Hyun-Woo Kim, Seoul (KR); Eun-Young Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 363 days.

(21) Appl. No.: 13/925,930

(22) Filed: Jun. 25, 2013

(65) Prior Publication Data
US 2013/0346923 A1     Dec. 26, 2013

(30) Foreign Application Priority Data

Jun. 25, 2012 (KR) ........................ 10-2012-0068138

(51) Int. Cl.
| | | |
|---|---|---|
| *G06F 3/048* | (2013.01) | |
| *G06F 3/0484* | (2013.01) | |
| *G06F 3/0488* | (2013.01) | |
| *G06F 3/0482* | (2013.01) | |
| *G06F 3/0481* | (2013.01) | |

(52) U.S. Cl.
CPC ........ *G06F 3/04842* (2013.01); *G06F 3/0482* (2013.01); *G06F 3/0488* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 5,214,756 A | * | 5/1993 | Franklin | G06F 3/04817 715/775 |
| 6,002,400 A | * | 12/1999 | Loring | G06F 3/0481 715/794 |
| 6,002,402 A | * | 12/1999 | Schacher | G06F 3/0481 715/810 |
| 7,735,018 B2 | * | 6/2010 | Bakhash | G06F 3/04815 345/419 |
| 8,799,813 B2 | * | 8/2014 | Jobs | G06F 3/0481 715/779 |
| 2003/0184600 A1 | | 10/2003 | Lin-Hendel | |
| 2007/0094597 A1 | * | 4/2007 | Rostom | G06F 3/0482 715/700 |
| 2007/0261002 A1 | | 11/2007 | Hu et al. | |
| 2008/0163053 A1 | * | 7/2008 | Hwang | G06F 3/0482 715/702 |
| 2008/0207188 A1 | * | 8/2008 | Ahn | G06F 3/04847 455/418 |

(Continued)

FOREIGN PATENT DOCUMENTS

EP        1 956 472 A1      8/2008

*Primary Examiner* — Hua Lu
(74) *Attorney, Agent, or Firm* — Cha & Reiter, LLC

(57) ABSTRACT

Disclosed is a method and apparatus for displaying a menu in a mobile device. An object generating event is detected for at least one selected menu item icon of at least one menu displayed on a touch screen. When the object generating event is detected, an object is generated and displayed, which performs an equivalent function to that of the at least one selected menu item icon.

19 Claims, 14 Drawing Sheets

(56) References Cited

U.S. PATENT DOCUMENTS

| | | | |
|---|---|---|---|
| 2009/0228820 A1* | 9/2009 | Kim | G06F 3/04817 715/769 |
| 2010/0169813 A1* | 7/2010 | Chang | G06F 3/0482 715/767 |
| 2010/0269040 A1 | 10/2010 | Lee | |
| 2011/0252344 A1 | 10/2011 | van Os | |
| 2012/0176398 A1* | 7/2012 | Takaoka | G06F 3/04883 345/589 |
| 2012/0226978 A1* | 9/2012 | Harberts | G06F 3/0482 715/702 |
| 2013/0125018 A1* | 5/2013 | Park | G06Q 10/00 715/748 |

* cited by examiner

APPARATUS AND METHOD FOR DISPLAYING MENU IN MOBILE DEVICE

CLAIM OF PRIORITY

This application claims the priority under 35 U.S.C. § 119(a) of an application entitled "Apparatus and Method for Displaying Menu in Mobile Device" filed in the Korean Intellectual Property Office on Jun. 25, 2012 and assigned Serial No. 10-2012-0068138, the contents of which are hereby incorporated by reference.

BACKGROUND

1. Technical Field

The present disclosure relates to an apparatus and method for displaying a menu in a mobile device, and more particularly, for displaying a menu with efficient use of a screen of the mobile device.

2. Description of the Related Art

Various technologies for mobile devices are currently developed. Particularly, as touch screen mobile devices have evolved, where the touch screen functions as a convenient input unit, the technology development for a user interface of the mobile device has accelerated.

In a touch screen mobile device, when a particular application is executed, menus for providing various functions on the application can be displayed on the touch screen. For example, an environment setting menu for setting an environment of the mobile device, or a menu including drawing tools in a drawing application and the like, can be displayed. Further, the mobile device can detect a user's touch gesture such as a touch for selecting an item or an icon included in the menu through the touch screen.

However, the mobile device has a disadvantage of a relatively small display unit in comparison with a desktop PC. Accordingly, when one or more menus with multiple selections is displayed on the touch screen, a considerable portion of the relatively smaller touch screen may be hidden by the menu.

Further, in a hierarchical menu structure including a higher menu (main menu) and a lower menu (sub-menu) associated with the higher menu, when an icon of the lower menu is desired to be executed, the higher menu is first accessed and then the lower menu is sequentially accessed. Accordingly, when the user wants to execute an icon belonging to the lower menu or to a sub-menu of the lower menu (e.g., from a "lowest menu"), the user is required to sequentially access the higher menu, the lower menu, and the lowest menu, and then the icon belonging to the lowest menu. As a result, the user repeats such a process of executing the menus multiple times. Therefore, in order to execute the icon belonging to the lowest menu, the user inconveniently performs many touches to gain access to the desired icon and execute its associated function.

Furthermore, in order to execute the icon of the lowest menu, it is required to display a plurality of menus from the higher menu to the lowest menu on the display unit of the mobile device. However, as described above, the mobile device has a relatively small display screen, a considerable portion of which becomes hidden by the plurality of menus when the menus are displayed. Accordingly, the user cannot maximally use an optimized touch screen for displaying a screen of the mobile device.

SUMMARY

Accordingly, an aspect of the present invention provides an apparatus and a method for displaying a menu capable of efficiently using a screen of a mobile device.

In accordance with an aspect of the present invention, there is provided a method for displaying a menu in a mobile device. An object generating event is detected for at least one selected menu item icon of at least one menu displayed on a touch screen. When the object generating event is detected, an object is generated and displayed, which performs an equivalent function to that of the at least one selected menu item icon.

In accordance with an embodiment, there is provided an apparatus for displaying a menu in a mobile device, the apparatus including a touch screen for displaying a screen of the mobile device; and a controller configured to detect an object generating event for at least one selected menu item icon of at least one menu displayed on the touch screen, and to generate and control display of an object for performing an equivalent function to that of the at least one selected menu item icon when the object generating event is detected.

In accordance with a menu displaying method and apparatus in a mobile device according to an embodiment, there is an advantage of executing a function of a menu item icon only by executing an object after generating the object having the same function as that of the menu item icon.

Therefore, in accordance with a menu displaying method and method in a mobile device according to an embodiment, there is an advantage of optimizing a touch screen and maximally using the optimized touch screen.

DETAILED DESCRIPTION

Figure 1:
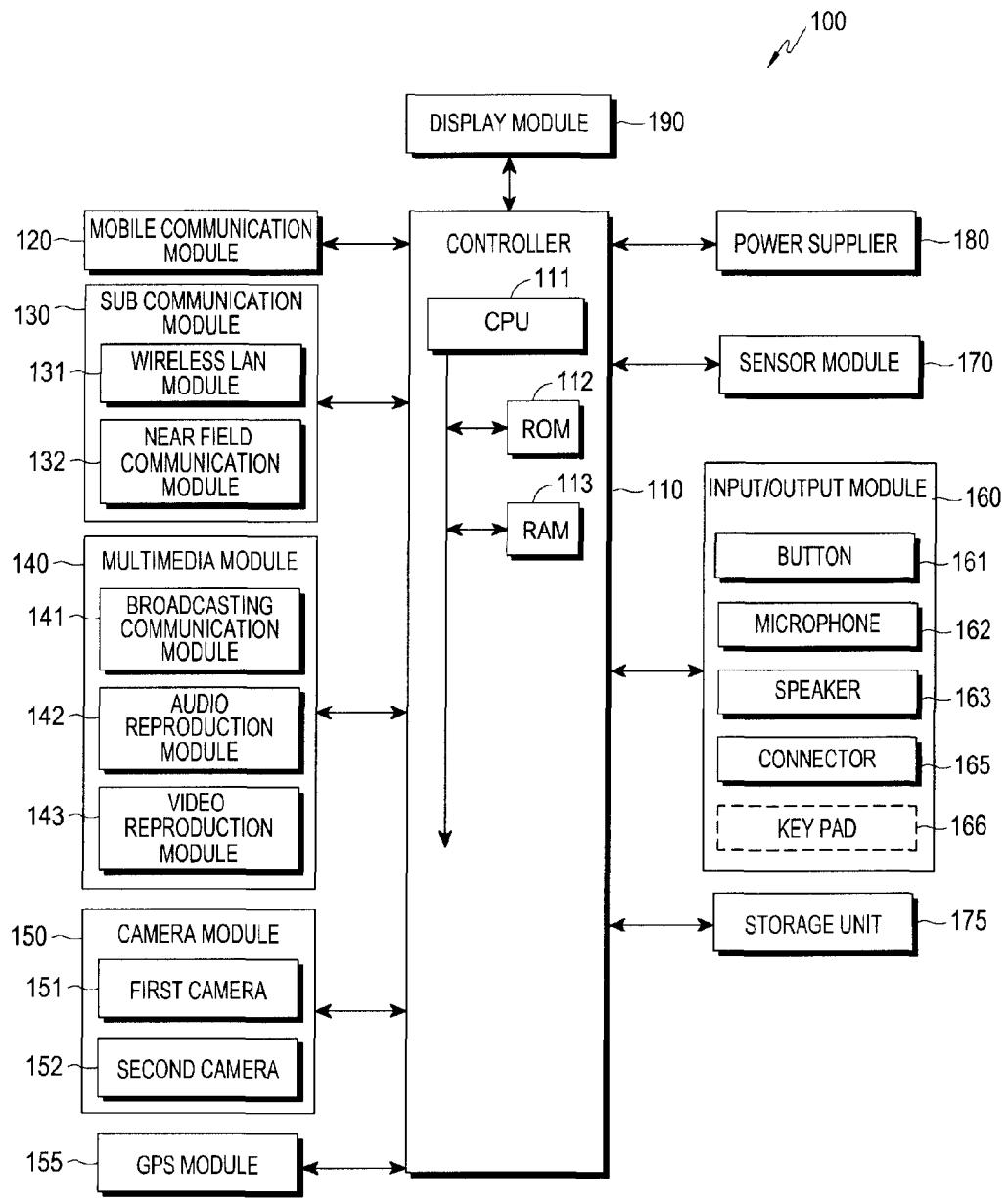
FIG. 1 is a block diagram schematically illustrating an example mobile device which may incorporate embodiments of the invention.

Hereinafter, exemplary embodiments of the present invention will be described with reference to the accompanying drawings. Like reference numerals presented in each drawing designate members for performing substantially like functions. It shall be understood that the present invention is not limited and restricted by the Terms such as "first" and "second" can be used to describe various elements, but the elements are not limited to the terms, as these terms are used only to distinguish one element from another element. For example, without departing from the scope of the invention, a first element may be considered a second element and the second element may be considered the first element. The term, "and/or", includes a combination of plural elements or any one of the plural elements.

If a component is described as being "connected to" or "coupled to" another component, it shall be understood that a third component may exist between the components although the firstly referred-to component may be directly connected or coupled to the another embodiment. However, if it is described that a component is "directly connected to" or "directly coupled to" another component, it shall be understood that no other component exists between the components.

As used herein, terms are used merely for describing specific embodiments and are not intended to limit the present invention. Singular terms such as "a" cover plural components unless the singular terms have apparently different meanings contextually. In this application, terms, such as "comprise" or "have," shall be understood that they are used merely for designating that corresponding features, numbers, steps, actions, components, parts or combinations thereof may exist, but not excluding in advance the possibility of addition to the features, numbers, steps, actions, components, parts or the combinations thereof.

Unless defined otherwise, all the terms including technical or scientific terms used herein have the same meaning as those understood generally by a person having ordinary skill in the art. The terms having the same meaning as those defined in generally used dictionaries shall be construed to have the meaning conforming to the contextual meaning of the related technologies, and shall not be construed as an ideal or excessively formal meaning unless the terms are expressly defined in this application. Hereinafter, embodiments of the present invention will be described in detail with reference to accompanying drawings.

As used herein, the phrase "executing an object" and other forms thereof means selecting an object displayed on a display in a manner to execute a function associated with the object. The object can be selected for such execution by means of a predetermined touch gesture performed on the object while displayed on a touch screen.

FIG. 1 is a block diagram schematically illustrating an example mobile device, 100, which may incorporate embodiments of the invention. Mobile device 100 can be any portable electronic device with a touch screen display, such as a smart phone, a tablet PC, an electronic game, a personal digital assistant (PDA), or a camera. Mobile device 100 can be connected to an external device or network by using a mobile communication module 120, a sub communication module 130, or a connector 165.

Mobile device 100 may further include a controller 110, a multimedia module 140, a camera module 150, a GPS module 155, an input/output module 160, a sensor module 170, a storage unit 175, a power supplier 180, and a display unit 190, or any combination thereof. The sub communication module 130 includes a wireless LAN module 131 and/or a near field communication module 132. Multimedia module 140 includes a broadcasting communication module 141, an audio reproduction module 142, and/or a video reproduction module 143. The camera module 150 includes a first camera 151 and optionally a second camera 152; the input/output module 160 includes button(s) 161, a microphone 162, a speaker 163, a vibration motor 164, the connector 165, and/or a keypad 166.

The controller 110 may include a ROM 112 storing a control program for controlling the mobile device 100 and a RAM 113 used as a storage area for storing a signal or data input from an external source and for work performed in the mobile device 100. A CPU 111 may include a single core, a dual core, a triple core, or a quad core. The CPU 111, the ROM 112, and the RAM 113 can be mutually connected to each other through an internal bus.

The controller 110 detects an object generating event for one or more menu item icons from one or more menus including the one or more menu item icons displayed on a touch screen. When the object generating event is detected, an object for performing the same function as the one or more menu item icons is generated and displayed on the touch screen. Further, the controller detects an object executing event for the object. When the object executing event is detected, a function of the object can be executed. Further, the controller detects a sub object generating event for the object. When the sub object generating event is detected, a sub object performing a sub function of the object function is generated and displayed on the touch screen. Furthermore, the controller detects a touch on a menu hiding icon for temporarily hiding one or more menus displayed on the touch screen. When the touch is detected, the one or more menus except for the object can be hidden from the touch screen. Moreover, the controller detects a touch on a menu returning icon for returning the one or more menus temporarily hidden from the touch screen. When the touch is detected, the hidden one or more menus are returned to the touch screen. Further, the controller detects an object deleting event for deleting the object. When the object deleting event is detected, the object can be deleted from the touch screen.

The controller 110 can control the mobile communication module 120, the sub communication module 130, the multimedia module 140, the camera module 150, the GPS module 155, the input/output module 160, the sensor module 170, the storage unit 175, the power supplier 180, and the display unit 190.

The mobile communication module 120 enables the mobile device 100 to be connected with the external device through mobile communication by using one or more antennas according to a control of the controller 110. The mobile communication module 120 transmits/receives a wireless signal for voice phone communication, video phone communication, a Short Message Service (SMS), or a Multimedia Message Service (MMS) with another communication device The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 can be Internet-connected according to a control of the controller 110 in a place where a wireless Access Point (AP) (not shown) is installed. The wireless LAN module 131 supports a wireless LAN standard (IEEE802.11x) of the Institute of Electrical and Electronics Engineers (IEEE). The near field communication module 132 can wirelessly perform near field communication between the mobile device 100 and an image forming apparatus (not shown) according to a control of the controller 110. A near field communication scheme may include Bluetooth, Infrared Data Association (IrDA) communication and the like.

The mobile device 100 may include at least one of the mobile communication module 120, the wireless LAN module 131, and the near field communication module 132, or combinations thereof, according to its capability. The multimedia module 140 may include the broadcasting communication module 141, the audio reproduction module 142, or the video reproduction module 143. The broadcasting communication module 141 can receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) according to a control of the controller 110. The audio reproduction module 142 can reproduce a digital audio file (for example, a file having a file extension of mp3, wma, ogg, or way) stored or received according to a control of the controller 110. The video reproduction module 143 can reproduce a digital video file (for example, a file having a file extension of mpeg, mpg, mp4, avi, mov, or mkv) stored or received according to a control of the controller 110. The multimedia module 140 may include the audio reproduction module 142 and the video reproduction module 143 except for the broadcasting communication module 141. Further, the audio reproduction module 142 or the video reproduction module 143 of the multimedia module 140 may be included in the controller 100.

The camera module 150 may include at least one of the first camera 151 and the second camera 152 for photographing a still image or a video according to a control of the controller 110. Further, the first camera 151 or the second camera 152 may include an auxiliary light source, for example, a flash, for providing sufficient light for the photograph. The first camera 151 may be disposed in a front surface of the mobile device 100, and the second camera 152 may be disposed in a back surface of the mobile device 100. In a different scheme, the first camera 151 and the second camera 152 are disposed adjacently to each other (for example, an interval between the first camera 151 and the second camera 152 is larger than 1 cm and smaller than 8 cm) to photograph a three dimensional still image or a three dimensional video.

The GPS module 155 receives radio waves from a plurality of GPS satellites on the earth's orbit, and can calculate a position of the mobile device 100 by using a time of arrival to the mobile device 100 from the GPS satellites. The position of the mobile device 100 calculated by the GPS module 155 may be represented by at least one of a latitude, a longitude, a height, and an orientation.

The input/output module 160 may include a plurality of buttons 161, the microphone 162, the speaker 163, the vibration motor 164, the connector 165, and the keypad 166.

The button 161 may be formed on a front surface, a side surface, or a back surface of a housing of the mobile device 100, and may include at least one of a power/lock button, a volume button, a menu button, a home button, and a back button.

The microphone 162 receives a voice or a sound to generate an electrical signal according to a control of the controller 110.

The speaker 163 can output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the exterior of the mobile device 100. The speaker 163 can output a sound (for example, button tone or ringing tone) corresponding to a function performed by the mobile device 100. One speaker 163 or a plurality of speakers 163 may be formed on a suitable position or positions of the housing of the mobile device 100.

The vibration motor 164 can convert an electrical signal to a mechanical vibration according to a control of the controller 110. For example, when the mobile device 100 in a vibration mode receives voice phone communication from another device (not shown), the vibration motor 14 is operated. One vibration motor 164 or a plurality of motors 164 may be formed within the housing of the mobile device 100. The vibration motor 164 can operate in response to a touch action of a user who touches the display unit 190 and successive touch actions on the display unit 190.

The connector 165 may be used as an interface for connecting the mobile device 100 and an external device, the mobile device 100 and an external power source. Data stored in the storage unit 175 of the mobile device 100 may be transmitted to the external device or the data may be received from the external device through a wired cable connected to the connector 165 according to a control of the controller 110. Power may be input from the external power source through the wired cable connected to the connector 165 or a battery (not shown) within the mobile device 100 may be charged.

The keypad 166 receives a key input from the user for the control of the mobile device 100. The keypad 166 includes a physical keypad formed in the mobile device 100 or a virtual keypad displayed on the display unit 190. The physical keypad formed in the mobile device 100 may be excluded according to capability or a structure of the mobile device 100.

The sensor module 170 includes at least one sensor for detecting a state of the mobile device 100. For example, the sensor module 170 may include a proximity sensor for detecting whether a user approaches the mobile device 100, a illuminance sensor for detecting an amount of ambient light of the mobile device 100, or a motion sensor for detecting the operation of the mobile device 100 (for example, a rotation of the mobile device 100, and an acceleration or vibration applied to the mobile device 100). At least one sensor can detect the state of the mobile device 100, generate a signal corresponding to the detection, and transmit the generated signal to the controller 110. The sensor of the sensor module 170 may be added or omitted according to the capability of the mobile device 100.

The storage unit 175 can store a signal or data input/output according to operations of the mobile communication module 120, the sub communication module 130, the multimedia module 140, the camera module 150, the GPS module 155, the input/output module 160, the sensor module 170, and the display unit 190. The storage unit 175 can store a control program and applications for controlling the mobile device 100 or the controller 110.

The term "storage unit" includes the storage unit 175, the ROM 112 and the RAM 113 within the controller 110, or a memory card (not shown) (for example, an SD card and a memory stick) installed in the mobile device 100. The storage unit may include a nonvolatile memory, a volatile memory, a Hard Disk Drive (HDD), or a Solid State Drive (SSD).

The power supplier 180 can supply power to one battery or a plurality of batteries provided at the housing of the mobile device 100 according to a control of the controller 110. The one or more batteries supply power to the mobile device 100. Further, the power supplier 180 can supply power input from an external power source to the mobile device 100 through a wired cable connected to the connector 165.

The display unit 190 can display an image of the mobile device provided by a control of the controller 110. The display unit 190 may include a touch screen, and the touch screen can provide the user with a user interface corresponding to various services (for example, phone communication, data transmission, broadcasting, taking a picture). The touch screen can transmit an analog signal corresponding to at least one touch input to the user interface to the controller 110. The touch screen can receive at least one touch through a user's appendage (for example, fingers including a thumb) or a touchable input means. Further, the touch screen can receive successive actions of one touch among at least one touch. The touch screen transmits the analog signal corresponding to successive actions of the input touch to the controller 110. The touch used in the present invention is not limited to a contact with the body of the user or the touchable input means (for example, stylus pen), and includes a hovering input on a touch screen. The touch screen may be implemented, for example, in a resistive form, a capacitive form, an infrared form, or an acoustic wave form.

It should be noted, that other input commands besides touch commands may be used to "execute an object". Voice commands and physical key input commands may be used for this purpose.

The controller 110 converts the analog signal received from the touch screen to a digital signal (for example, X and Y coordinates), and controls the display unit 190 by using the digital signal. For example, the controller 110 can control a shortcut icon displayed on the display unit 190, allowing it to be "selectable", and execute the shortcut icon in response to the touch.

Figure 2:
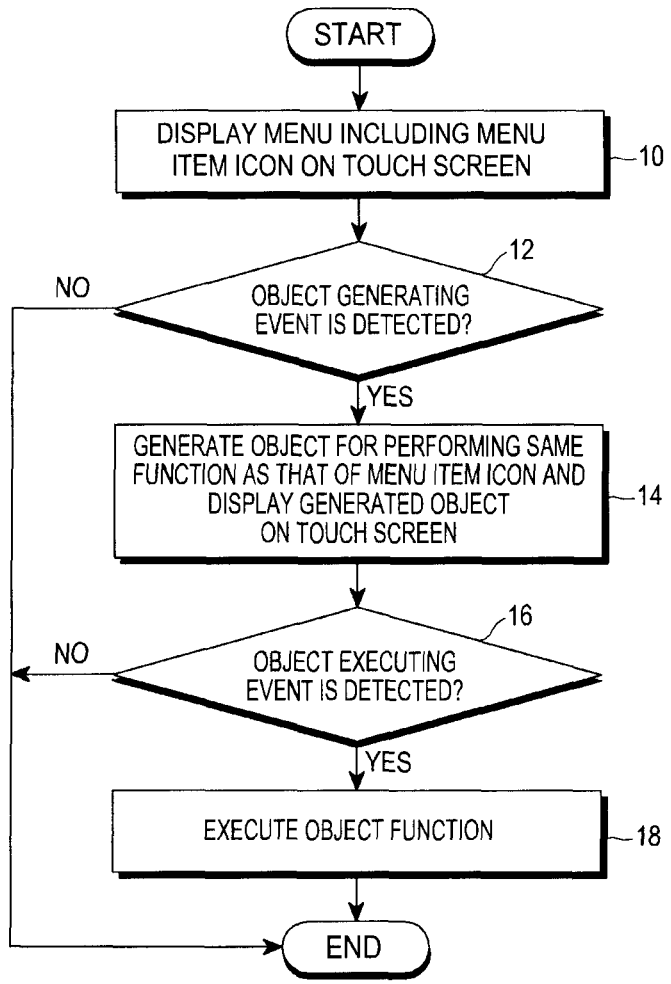
FIG. 2 is a flowchart of a menu displaying method in a mobile device according to an embodiment of the present invention.
Figure 3:
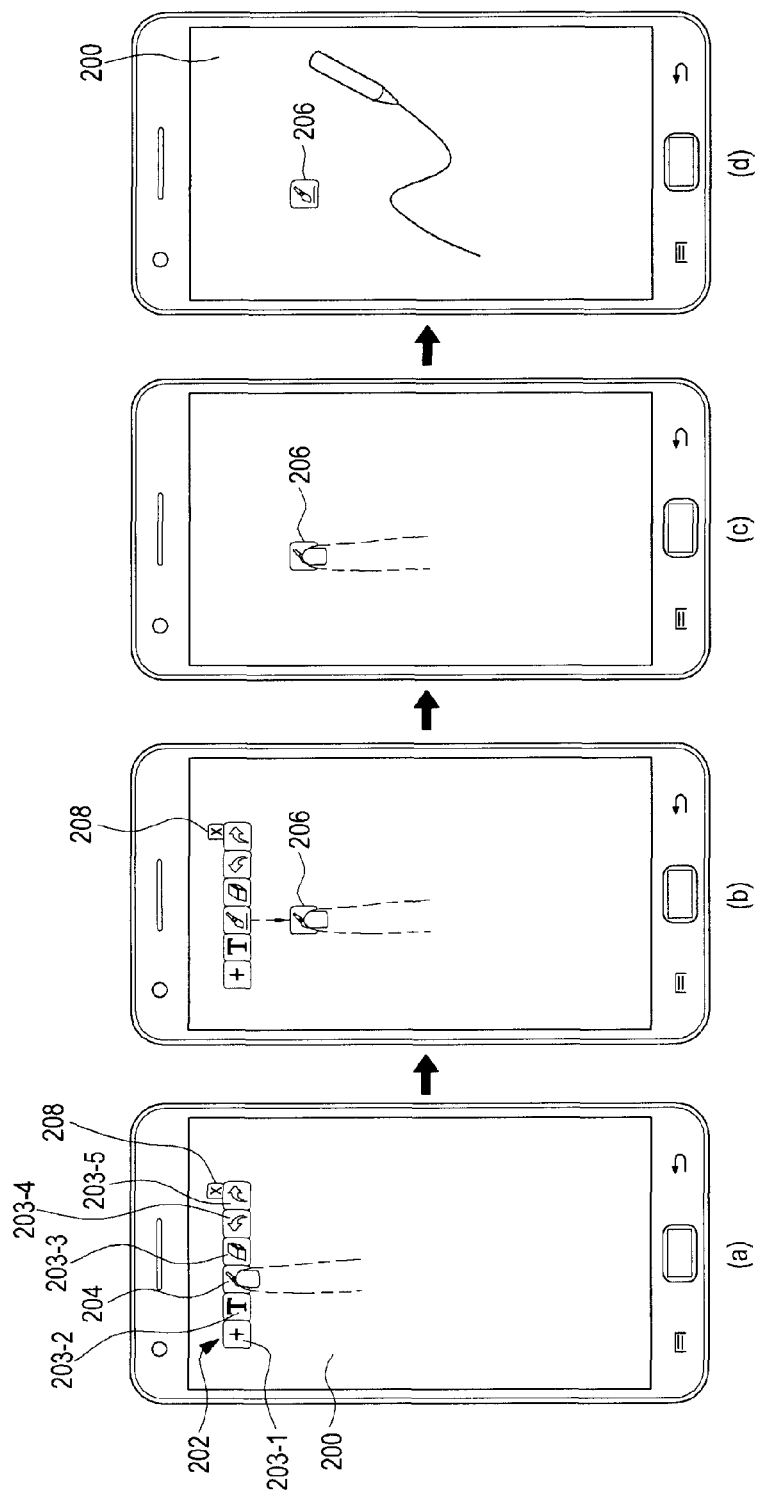
FIG. 3 depicts screen examples illustrating an implementation of the menu displaying method of FIG. 2.

FIG. 2 is a flowchart of a menu displaying method in a mobile device according to an embodiment of the present invention. FIG. 3 depicts example screens illustrating an implementation of the menu displaying method.

In the following description of the method of FIG. 2 and those of the figures thereafter, the various operations are assumed to be carried out under the control of the controller 110.

At the outset, the method first displays a menu (step 10) including at least one menu item icon on a touch screen. A menu example thereof is depicted in FIG. 3, screen (a). That is, a menu 202 in the form of a rectangular bar of side-by-side icons includes menu item icons 203-1, 203-2, 204, 203-3, 2-3-4 and 203-5 displayed on the touch screen 200.

The menu item icons 203-1 to 203-5 and 204 refer to icons for performing predetermined functions used in the mobile device. For example, one menu item icon may be a pen icon 204 for performing a function of drawing a line on the screen in a drawing application used in the mobile device. Other icons may be a storage icon 203-1 for storing the drawing in the storage unit in the drawing application, a text icon 203-2 for inputting a character text, an eraser icon 203-3 for deleting a drawn part, a return icon 203-4 for canceling a previously performed function, and a re-execution icon 205-5 for re-executing a previously canceled function. Many other possible icons for performing various other functions can be alternatively or additionally displayed. The menu 202 is a set including one or more menu item icons 203-1 to 203-5 and 204. In this example, the menu 202 may be a set having a bar shape in which the menu item icons are arranged in a row; however, various other configurations are possible. Further, the menu 202 may include a menu termination icon 208 for removing the menu 202 from the touch screen. When the menu 202 is so removed, it may be caused to reappear via a predetermined touch gesture in a predetermined area of the screen 202; or by a voice command or other input command. With continued reference to FIG. 2, at step 12, it is determined whether an "object generating event" is detected. This event refers to an event for generating an object via a predetermined type of touch input on a menu item icon (or icons), to select and activate the menu item touched. That is, the object generating event corresponds to an event for the selected one or more menu item icons 203-1 to 203-5 and 204 (hereafter, "the menu icons" for brevity). The predetermined touch input on the selected menu item(s) can be designated as any one or more of a single tap, a plurality of taps, a long touch (i.e., a simple touch maintained for more than a predetermined duration), a linear drag, a non-linear drag or a rotational drag. If the object generating event is detected at step 12, then at step 14 an object (or objects, if multiple icons are selected) is generated for performing the same function as that of the selected menu icon, and the generated object is displayed on the touch screen.

An example of an object generating event is shown in FIG. 3, in the transition from screen (a) to screen (b). A drag gesture in a downward direction is performed on menu icon 204, which is recognized as a touch input that generates a corresponding object for the touched icon 204. In response, the controller 110 generates an object 206 for performing the same function as that of the menu icon 204 and displays the generated object on the touch screen 200. In this example, the object 206 can perform a function of the pen icon 204 for performing the function of drawing a line on the screen in the drawing application used in the mobile device.

It should be noted, the generated object 206 can be generated with the same appearance as the selected menu icon 204, thus being rendered as a copy of the selected menu icon, as shown in the examples of FIG. 3. Alternatively, the generated object can be rendered in a different appearance or size. Further, in the example drag operation of screens (a) and (b), the generated object 206 appears to be dragged as a copy of the selected icon 204 to a current position of the drag, and the original menu 202 remains in an unchanged state. The user may then simplify the display screen by deleting the original menu 202 via touching the X ion 208, resulting in a screen with only the generated object, as shown in screen (c). In an embodiment variant, when the drag operation is performed on a selected icon 204 to generate the corresponding object 206 at a screen position away from the menu 202, the menu 202 may be caused to automatically disappear; the menu can then be caused to reappear upon detection of a predetermined input command. In another variant, only the icon 204 initially disappears from the menu 202 when the object 206 is generated; the remaining icons can be caused to disappear when the X icon 208 is touched.

At a next step 16 of FIG. 2, the controller 110 detects an "object executing event" for the generated object 206. The object executing event can be a touch input on the object 206, e.g., a single tap, a multi-tap, e.g., double tap, long touch, any drag type, or In the example of screen (c), a user performs a single tap as a new touch input (event), resulting in the display shown in screen (d). That is, when the object executing event is detected by the controller 110, it executes a function of the object in step 18. For example, as shown in screed (d), the function of the pen icon is executed, i.e., for drawing the line on the screen in the drawing application, which is the function of the menu item icon 204.

Accordingly, in accordance with the menu displaying method in the mobile device according to the embodiment of the present invention, the object for performing the same function as that of the selected menu icon is generated and the function of the menu icon can be executed just by executing the object. That is, in accordance with the exemplary menu displaying method, even when the menu disappears as shown in screen (c), the function of the menu icon can be executed by just executing the object. Further, in the example embodiment, the function of the pen icon for drawing the line on the screen in the drawing application, which is the function of the menu item icon, can be executed by executing the object also in an area where the menu disappears as shown in screen (c). Accordingly, there is an advantage of simplifying the touch screen for subsequent interaction operations with the selected function. Further, a predetermined input command can be designated to cause the menu 202 to reappear, such as a touch input on a certain portion of the screen.

Figure 4:
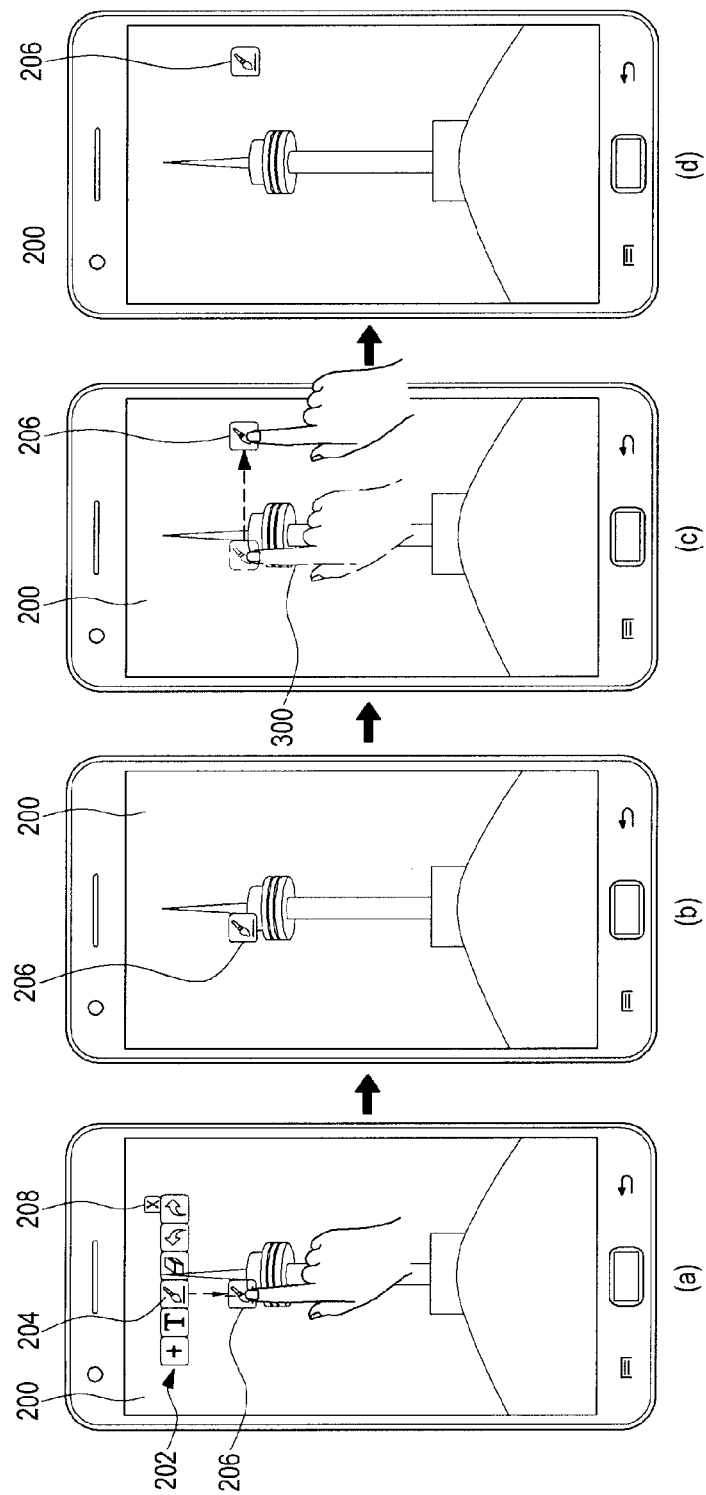
FIG. 4 depicts screen examples illustrating an alternative execution of the menu displaying method of FIG. 2.
Figure 5:
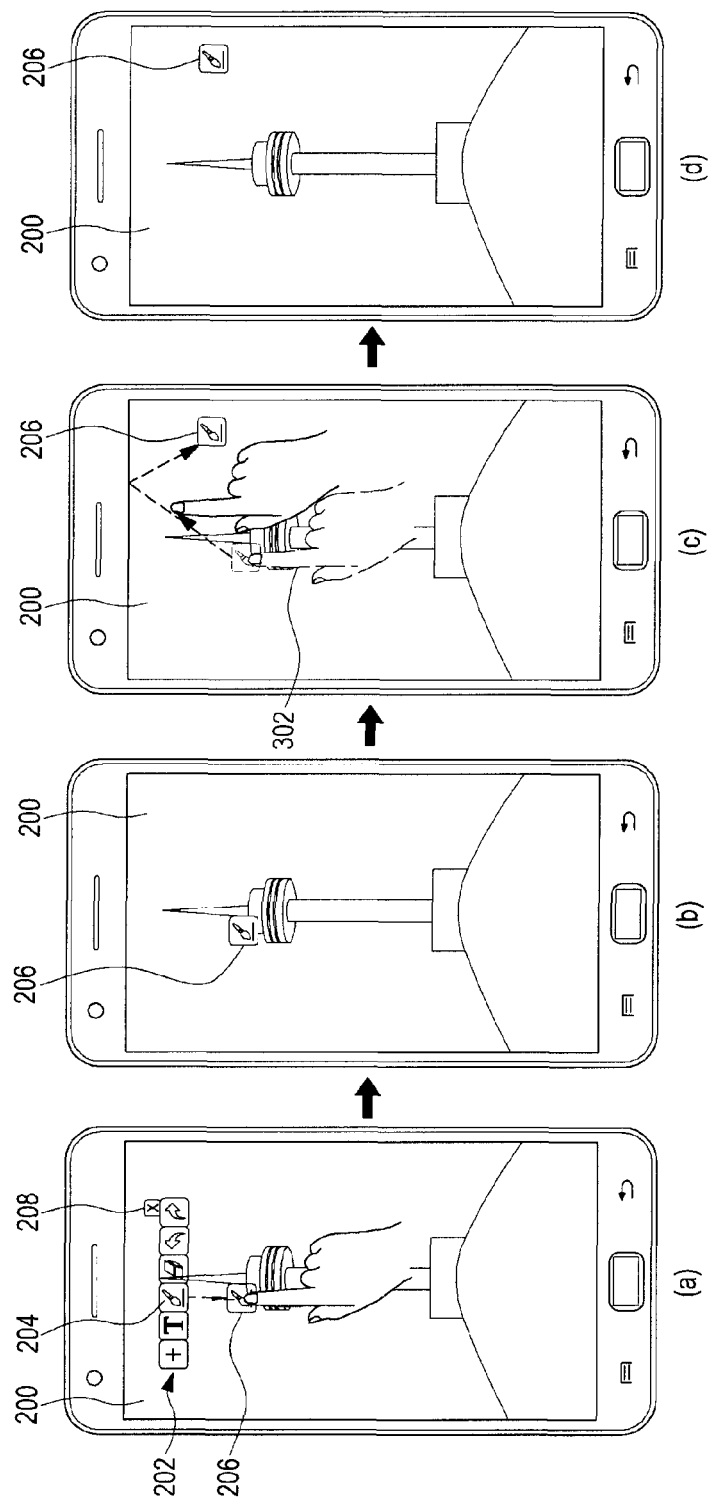
FIG. 5 depicts screen examples illustrating an alternative execution of the menu displaying method of FIG. 2.

FIGS. 4 and 5 depict example screens illustrating an execution of a menu displaying method in a mobile device according to another embodiment of the present invention. As shown in FIG. 4, screen (a) is the same as that in FIG. 3, except that the menu 202 is displayed superimposed over a background image. The screen examples (a) to (d) of FIG. 4 illustrate a method enabling flexible movement of the generated object 206 via touch drag input. As mentioned, due to its small size, it is desirable to optimize the mobile terminal screen and maximally use the optimized screen. Accordingly, when the generated object 206 can move, the screen of the mobile device can be optimized and the optimized screen can be used by moving the object 206 by the user if the object 206 is located in an area not desired by the user.

For example, referring to screen (a) of FIG. 4, in at least one menu 202 including the one or more menu item icons 204 displayed on the touch screen 200, the object generating event for the one or more menu item icons 204 is detected, and the object 206 generated by the controller 110 is displayed on the touch screen 200.

In FIG. 4, screens (a) and (b), since the menu 202 and the object 206 cover a mountain and a tower drawn on the touch screen 200, the user may be unable to perform a drawing action in an area near the mountain and the tower. Accordingly, it is desired to remove the image of the menu 202 and to move the object 206 from the area near the mountain and the tower.

Accordingly, referring to screen (b) of FIG. 4, when the touch on the menu termination icon 208 described for FIG. 3 is detected by the controller 110, the menu 202 can be removed from the touch screen 200 by the controller 110.

Further, referring to screen (c) of FIG. 4, since the object 206 can change a position on the touch screen 200 through a drag action 300, the object 206 can be moved to an area other than the area near the mountain and the tower Accordingly, referring to screen (d), the user can perform a drawing action on the area near the mountain and the tower by moving the object 206 to an area away from mountain and the tower, and thus the user can simplify the screen of the mobile device and perform an operation on the simplified screen. For instance, when another touch input on object 206 in screen (d) is detected, a drawing pen as shown in screen (d) of FIG. 3 will appear, enabling the user to draw lines superimposed with the image of the tower, without the obstruction of the menu image 202.

Referring to FIG. 5, the object 206 in the menu displaying method in the mobile device according to another embodiment of the present invention has a feature of selectively controlling object position change through flicking input on the touch screen 200.

For example, in screen (a), in at least one menu 202, the object generating event for menu icon 204 is detected as described previously, and the object 206 generated by the controller 110 is displayed on the touch screen 200. In screens (a) and (b), since the menu 202 and the object 206 cover a background mountain and a tower image, the user would rather not perform a drawing action in an area near the mountain and the tower. Accordingly, it is desired to move the menu 202 and the object 206 from the area near the mountain and the tower.

Accordingly, referring to screen (b), when the touch on the menu termination icon 208 as described previously is detected by the controller 110, the menu 202 can be removed from the touch screen 200 by the controller 110.

Further, as seen in screen (c), the position of the object 206 can be changed through a flicking action 302, whereby the object 206 can be moved to an area away from the mountain and the tower. Further, in response to the flicking action speed and direction, the object 206 can bounce when the object 206 appears to touch at least one side of the touch screen while the position of the object 206 is changed. Furthermore, when the object 206 touches at least one side of the touch screen and thus bounces from the one side, the object 206 can stop after moving by a predetermined distance according to an intensity of the flicking 302. For example, in screen (c), the object 206 can move in a direction of a top side of the touch screen 200 by the flicking detected by the controller 110. Further, when the object 206 touches the top side of the touch screen 200, the object 206 may bounce from the top side. Furthermore, the object 206 can stop after moving by the predetermined distance according to the intensity of the flicking 302 as shown in screen (c) Accordingly, as shown in screen (d), the user can perform the drawing action on the area near the mountain and the tower by first moving the object 206 to an area away from the mountain and the tower, and then inputting another predetermined command on the object 206 (executing the object). Thus the user can optimize the screen of the mobile device, facilitating a desired operation with the optimized screen.

Figure 6:
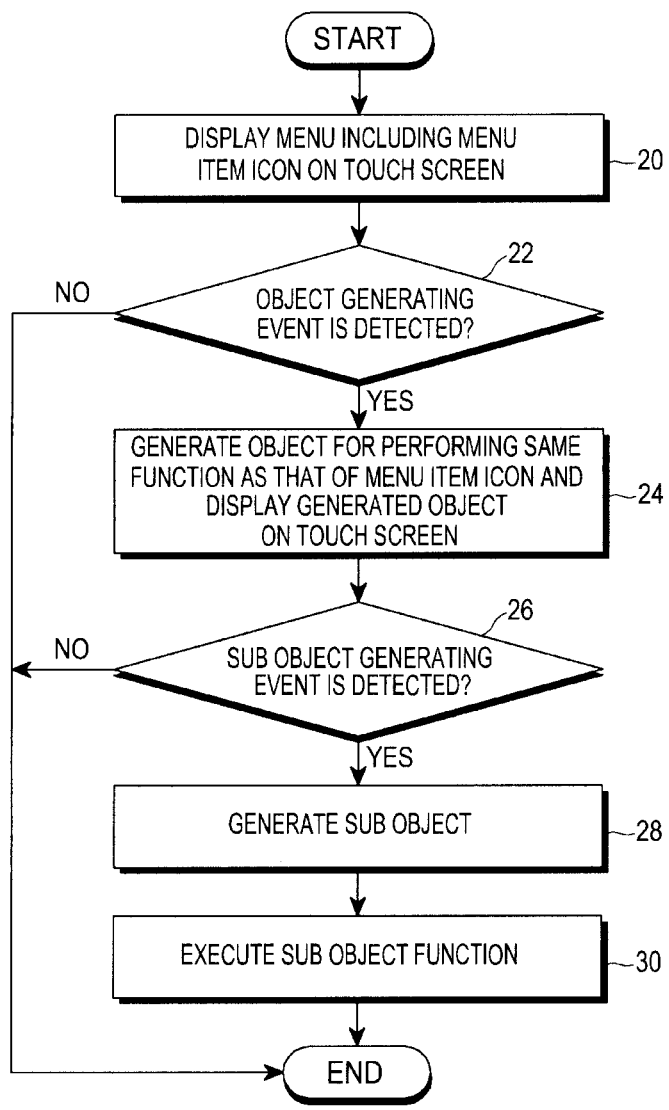
FIG. 6 is a flowchart of a menu displaying method in a mobile device according to another embodiment of the present invention.
Figure 7:
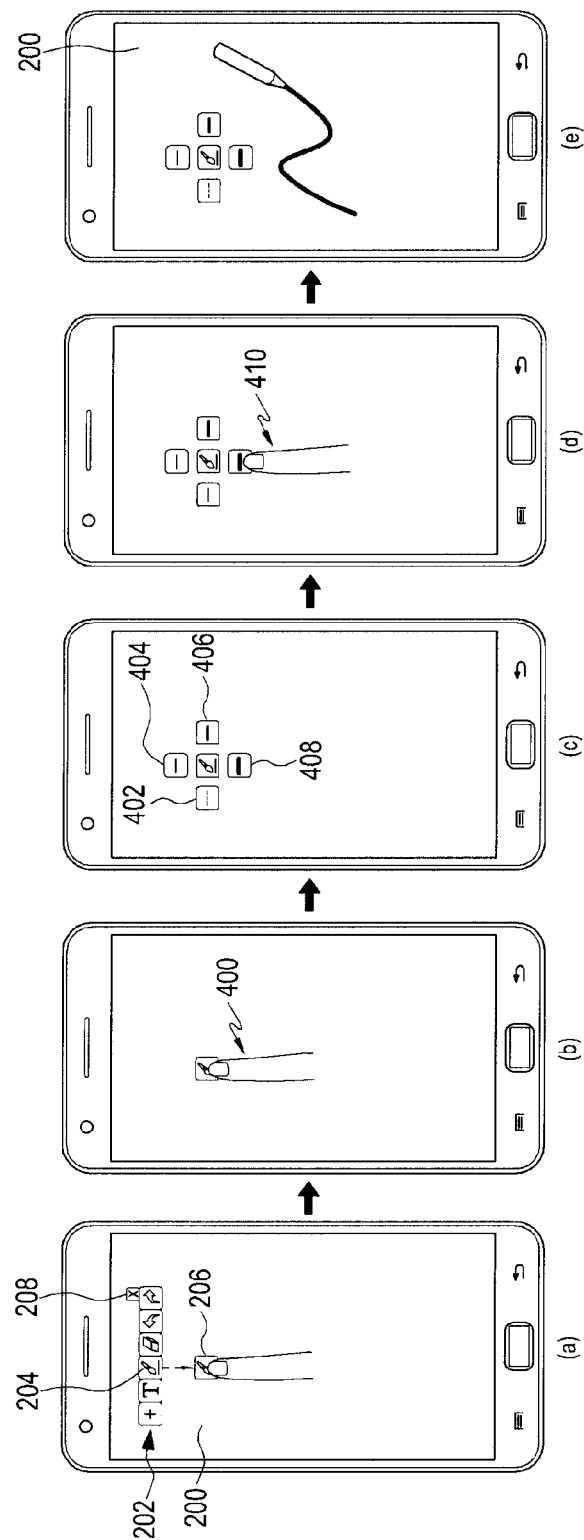
FIG. 7 depicts screen examples illustrating an execution of a menu displaying method in a mobile device according to another embodiment of the present invention.

FIG. 6 is a flowchart of a menu displaying method in a mobile device according to another embodiment of the present invention. FIG. 7 depicts screen examples illustrating an execution of this method.

Referring to FIG. 6, steps 20, 22 and 24, which generate the object 206 from the menu 202, are the same as steps 10, 12 and 14, respectively of FIG. 2. Screen (a) of FIG. 7 is the same as (b) of FIG. 3 to exemplify the relevant steps.

Next, at step 26, the controller can detect a sub object generating event for the object. The sub object generating event refers to an event for generating a sub object which will be described below. The sub object generating event may be a touch input on the object 206, which may be any of the touch inputs noted above, e.g., single tap, multi-tap, long touch, any type of drag, or flick. A voice command could also be used to generate the sub object. In the example of FIG. 7, screen (b), a new touch input 400 on the object 206 is made to initiate the sub object generating event. Note that prior to, or after, this new touch input 400, the menu 200 image may have been caused to disappear (as illustrated in (b)) via touch input on the X icon 208.

In the next step 28, when the sub object generating event is detected by the controller 110, the controller 110 generates a sub object for performing a sub function of the function of the object, and displays the generated sub object on the touch screen. The sub function may be a function of a lower menu item icon of the one or more menu item icons corresponding to the object.

For example, the sub object generating event may be touch input 400, e.g., a long touch or tap on the object 206 as shown in (b). Accordingly, when the touch input 400 is detected sub objects 402 to 409 are generated and displayed, for performing sub functions of the function of the object 206. In the example, the object 206 performs the same function as that of the menu item icon 204 which is the pen icon for drawing the line on the screen in the drawing application. Accordingly, the sub function of the object 206 may be the function of the lower item icon of the pen icon For instance, the lower item icon of the pen icon may be a line thickness icon for selecting a thickness of the pen. Accordingly, the controller 110 can generate the sub objects 402 to 408 for performing the function of selecting the line thickness which is the sub function of the object 206, and display the generated sub objects on the touch screen as shown in screen (c). At this time, the controller 110 can place and display the sub objects 402 to 408 in the area near the object 206 in a radial form surrounding the object 206.

With continued reference to FIG. 6, in the next step 30, the controller 110 detects a sub object executing event, whereupon the sub function of the object is performed. The sub object executing event may be an event for touching the sub object. Here, the touch input may be any of the types mentioned above. For example, as shown in screen (d), in a case where the sub object executing event is the touch on a sub object 408, when a touch input 410 on the sub object 408 is detected, the sub object can be executed by the controller. At this time, as shown in screen (e), when the function of the sub object is selecting the line thickness, the controller 110 selects a line thickness corresponding to the function of the sub object on which the touch 410 is detected, and displays the line on the touch screen.

Accordingly, as compared to conventional methodology, the embodiment enables, the user to execute a lower menu item icon through a small number of touches. As mentioned, conventional methods require the user to open a series of hierarchical menus to access and execute a sub menu such as the line thickness menu exemplified in FIG. 7. The present approach, by contrast, enables such access and execution in a shorter period of time, via direct execution of the objects as described.

Figure 8:
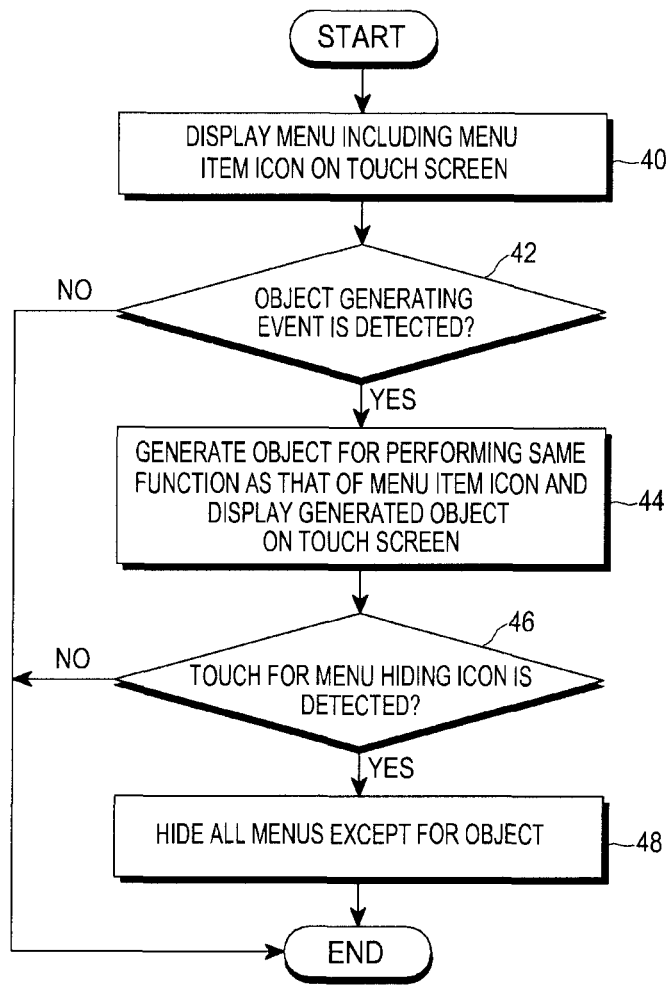
FIG. 8 is a flowchart of a menu displaying method in a mobile device according to another embodiment of the present invention.
Figure 9:
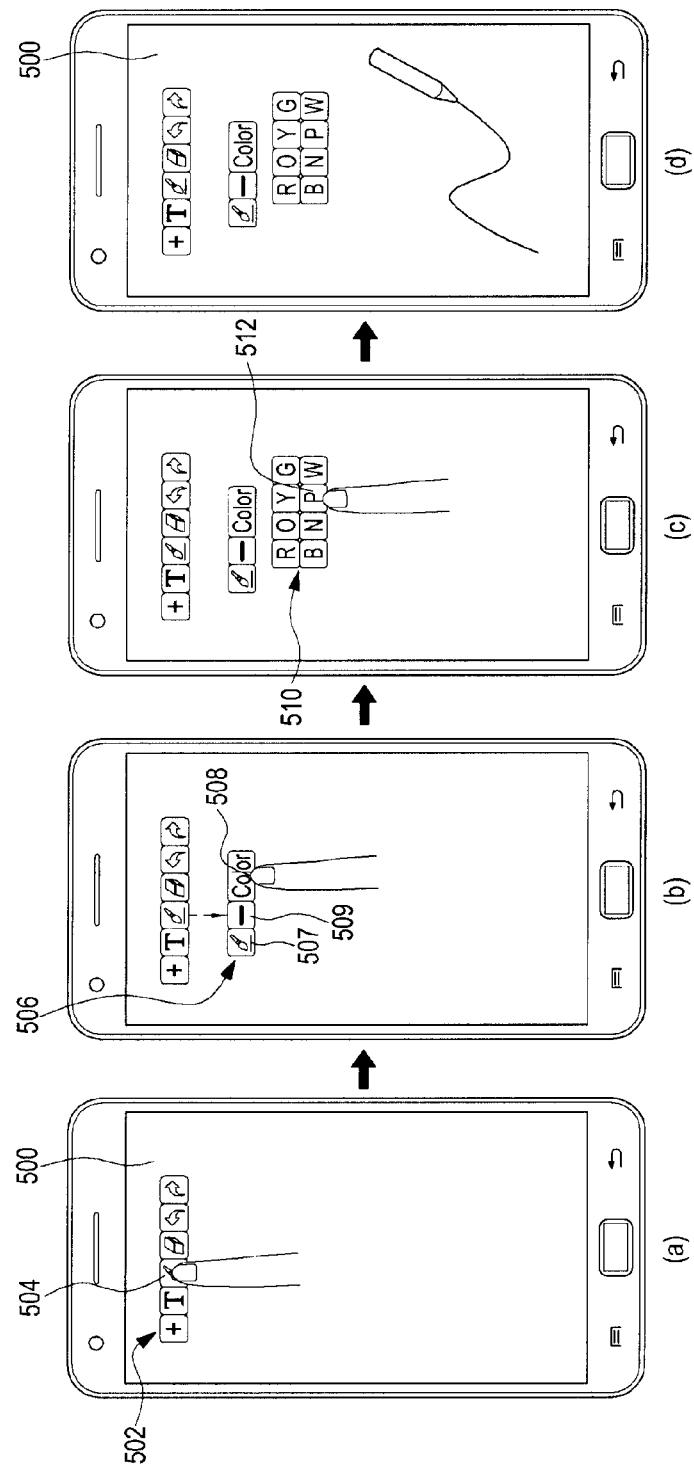
FIG. 9 depicts screen examples illustrating an execution of a comparative example for a menu displaying method in a mobile device.
Figure 10:
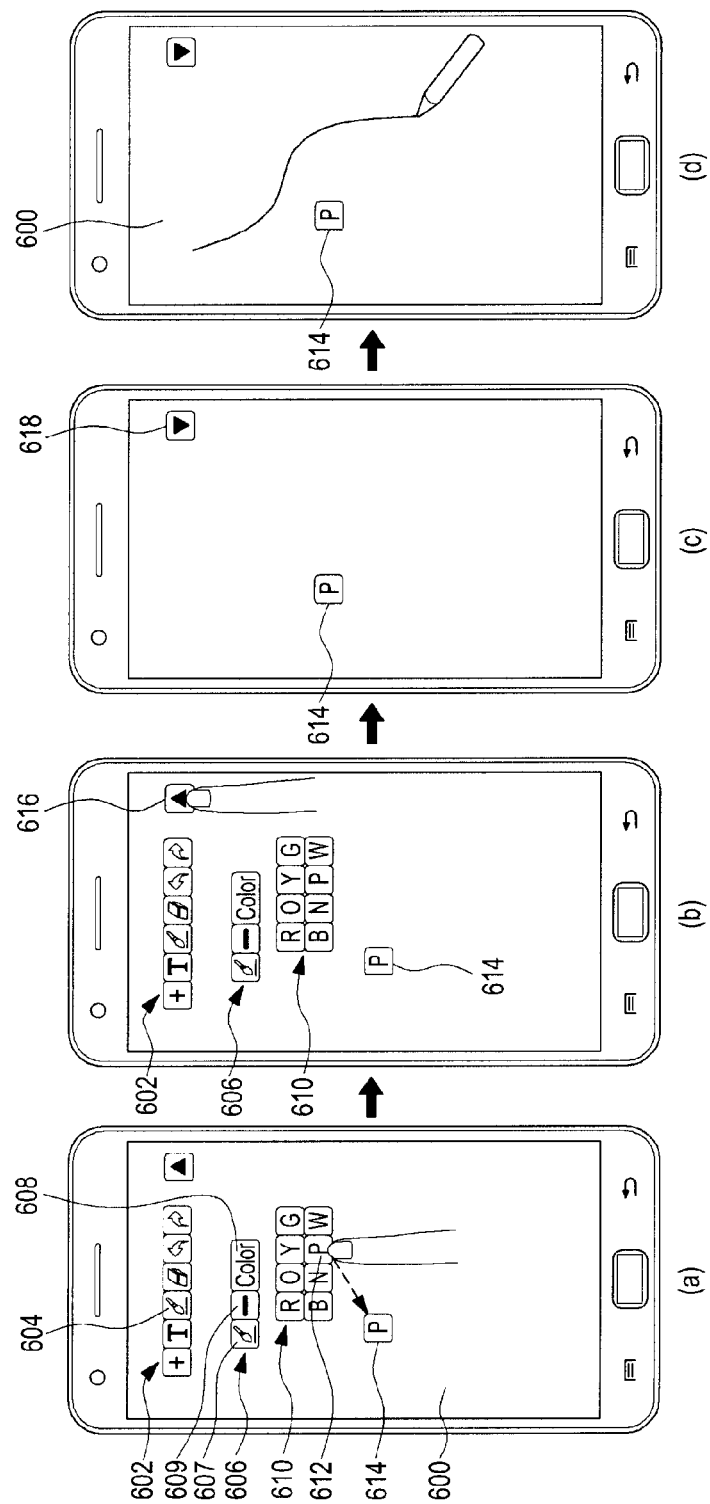
FIG. 10 depicts screen examples illustrating an execution of a menu displaying method in a mobile device according to another embodiment of the present invention.

FIG. 8 is a flowchart of a menu displaying method in a mobile device according to another embodiment of the present invention. FIGS. 9 and 10 illustrate screen examples to exemplify different implementations of the embodiment.

Steps 40 and 42 of the method are the same as steps 10 and 12, respectively, of FIG. 2; however, in screen (a) of FIG. 9, icon 504 of a first menu 502 is selected to generate an object. But instead of generating an object such as 206 similar or identical to the selected menu icon 504, a second menu 506 is automatically generated. Thus, in step 44, the object generated is the second menu 506 (note that step 44 also includes execution of the menu 506). First menu 502 includes a first menu item icon such as a pen icon 504 for performing a pen function displayed on a touch screen 500. When a first touch for executing the pen icon 504 is detected, the second menu 506 is displayed, which includes first lower menu item icons 507, 508 and 509 of the pen icon 504, as shown in screen (b). These icons can be a pen type icon 507 for selecting a pen type, a line thickness icon 509 for selecting a line thickness, and a color icon 508 for selecting a line color. Further, when a second touch for executing the color icon 508 is detected by the controller, the controller displays a third menu 510 including second lower menu item icons of the color icon 508 as shown in screen (c). The second lower menu item icons may include a red icon (R), an orange icon (O), a yellow icon (Y), a green icon (G), a blue icon (B), a navy icon (N), a purple icon (P), and a white icon (W). For instance, when a third touch for executing the purple icon (P) 512 is detected by the controller, the controller can execute a function of drawing a purple line on the touch screen as shown in screen (d).

According to the comparative example shown in screens (a) to (d) of FIG. 9, all of the first menu 502, the second menu 506, and the third menu 510 are displayed to execute the purple icon 512 at the lower level, such that a larger portion of the touch screen is hidden by the three menus 502, 506 and 510. Accordingly, when executing the low menu item icons, an area in which the drawing is possible becomes smaller. This restriction is alleviated with the implementation described below in reference to FIG. 10.

With continued reference to FIG. 8, once the object is generated at step 14, this state corresponds to any of screens (b) through (d) of FIG. 9. However, if a touch for a menu hiding icon is detected at step 46, a menu hiding function is performed, as illustrated in FIG. 10, screens (a) through (d). Referring to screen (a), menus 602, 606 and 610 can be the same as menus 502, 506 and 510 of FIG. 9. (Note that an "X" icon such as 208 of FIG. 3 is not included in FIG. 9 or 10, for reasons that will become apparent below.) First menu 602 includes a first menu item icon such as a pen icon 604 for performing a pen function displayed on touch screen 600. When a first touch for executing the pen icon 604 is detected by the controller 110, the controller 110 can display the second menu 606 including first lower menu item icons of the pen icon 604 on the touch screen. The first lower menu item icons include a pen type icon 607 for selecting a pen type, a line thickness icon 609 for selecting a line thickness, and a color icon 608 for selecting a line color. Further, when a second touch for executing the color icon 608 is detected by the controller, the controller can display a third menu 610 including second lower menu item icons of the color icon 608 (analogous to color icon 508 described above). In the example of FIG. 9, once the purple icon 512 is selected, its function is executed as shown in FIG. 9, screen (d), but the three menus 502, 506 and 510 remain displayed, blocking a portion of the display screen. In the implementation of FIG. 10, when a predetermined touch input is detected on a lower icon such as the purple icon 612, an object 614 is generated and displayed, for performing the same function as icon 612 when subsequently executed. Thus, in the method of FIG. 8 corresponding to the implementation of FIG. 10, an additional object 614 is generated (besides the object 606) in response to additional touch input.

In a next step, the controller 110 can detect a touch on a menu hiding icon for temporarily hiding at least one menu displayed on the touch screen in step 46. For example, referring to screen (b) of FIG. 10, a menu hiding icon 616 is displayed on the touch screen. (Icon 616 may be initially displayed along with menu 602, or alternatively it is displayed only after at least one of the sub menus 606, 610 is displayed.) The menu hiding icon 616 has a function of temporarily hiding at least one menu displayed on the touch screen. Accordingly, the controller 110 can detect the touch on the menu hiding icon 616 as shown in the transition from screen (b) to (c).

In a next step, when the touch is detected by the controller 110, the controller 110 can hide at least one menu except for the second object from the touch screen in step 48. For example, referring to screen (c), when the touch on the menu hiding icon 616 displayed on screen (b) is detected, the controller 110 can hide the at least one menu 602, 606, and 610 except for the object 614 from the touch screen 600. Further, when a step of detecting a touch on a menu return icon 618 for returning at least one menu temporarily hidden from the touch screen and the touch are detected, the menu displaying method may further include a step of returning at least one hidden menu on the touch screen. Therefore, in the presently described embodiment, at least one menu 602, 606, and 610 except for the object 614 can be hidden from the touch screen and returned on the touch screen by detecting touches on the menu hiding icon 616 and the menu return icon 618. Accordingly, the object 614 is excluded from a process in which at least one menu is hidden. Therefore, the object 614 is not hidden even when at least one menu is hidden as shown in FIG. 10, screen (c), and thus the user can execute the object 614 with ease. For example, in a case where the object 614 performs the same function as that of the purple icon 612 for drawing the purple line on the touch screen, when an object executing event for executing the object 614 is detected by the controller 110, the controller 110 can execute the function of drawing the purple line as shown in screen (d). At this time, since at least one menu is hidden, there is an advantage of performing the drawing in an area where at least one menu had been displayed.

Figure 11:
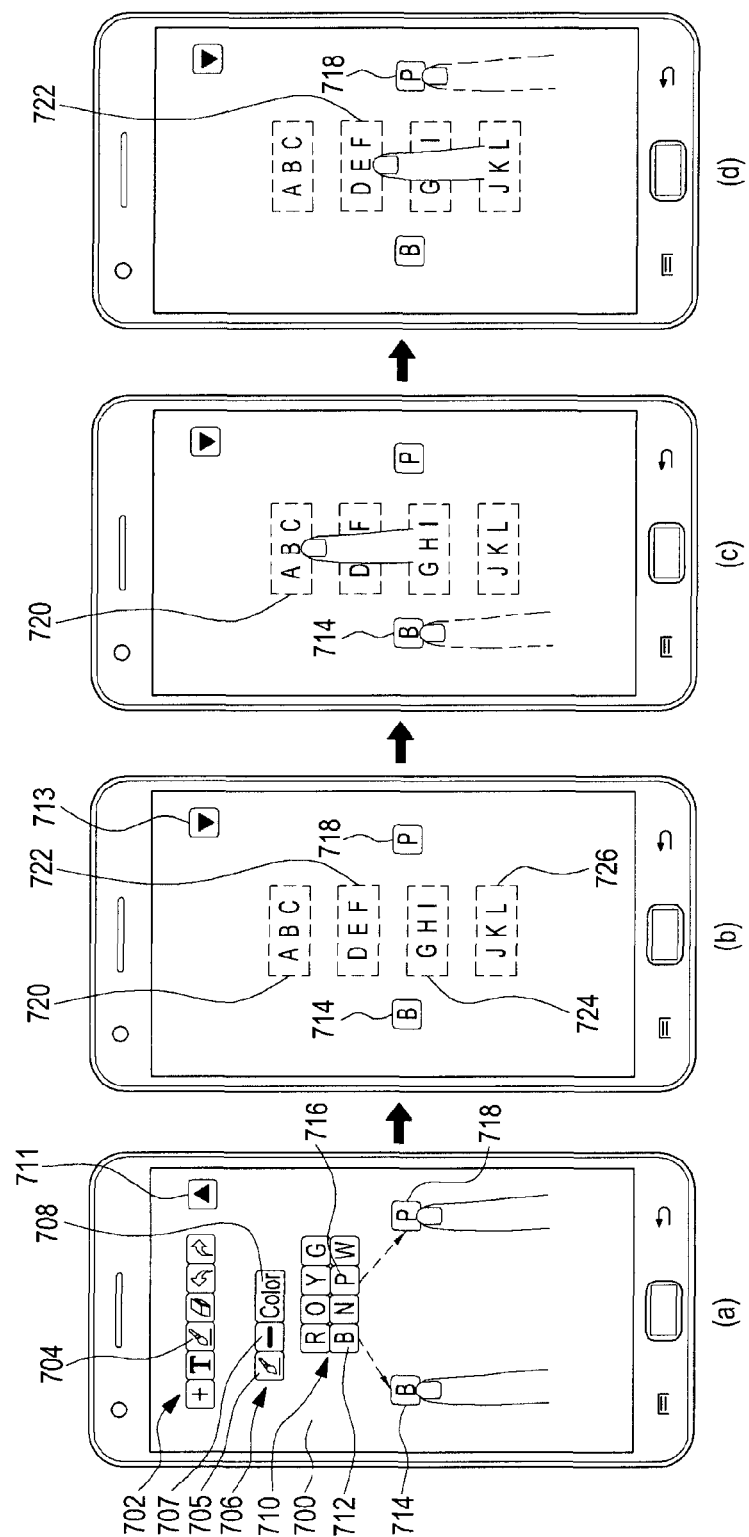
FIG. 11 depicts screen examples illustrating an execution of a menu displaying method in a mobile device according to another embodiment of the present invention.

Therefore, in accordance with the menu displaying method in the mobile device according to the afore-described embodiment of the present invention, the touch screen can be optimized and maximally used in the mobile device having a smaller display unit in comparison with a desktop PC. FIG. 11 depicts screen examples illustrating an execution of a menu displaying method in a mobile device according to yet another embodiment of the present invention.

Referring to screen (a), a first menu 702 including a first menu item icon such as a pen icon 704 for performing a pen function is displayed on a touch screen 700. Further, when a first touch for executing the pen icon 704 is detected by the controller 110, the controller 110 can display a second menu 706 including first lower menu item icons of the pen icon 704 on the touch screen. The first lower menu item icons include a pen type icon 707 for selecting a pen type, a line thickness icon 709 for selecting a line thickness, and a color icon 708 for selecting a line color. Further, when a second touch for executing the color icon 708 is detected by the controller, the controller can display a third menu 710 including second lower menu item icons of the color icon 708 (analogous to icon 508 described above). At this time, when an object generating event for the blue icon (B) 712 included in the second lower menu item icons is detected by the controller 110, the controller 110 can generate a first object 714 for performing the same function as that of the blue icon 712 and display the generated object on the touch screen 700. Further, when an object generating event for the purple icon (P) 716 included in the second lower menu item icons is detected by the controller 110, the controller 110 can generate a second object 718 for performing the same function as that of the purple icon 716 and display the generated object on the touch screen 700.

Further, as seen in screen (a), a menu hiding icon 711 is displayed on the touch screen. The menu hiding icon 711 has a function of temporarily hiding at least one menu displayed on the touch screen. When a touch input is detected on icon 711, at least one menu is hidden from the touch screen, but the generated objects 714 and 718 are not hidden, as illustrated in screen (b). The menu hiding icon 711, after executed to hide the menus, is converted to a menu return icon 713 which can be executed to return the menus (in the same manner as menu return icon 618 described above.)

According to another embodiment of the present invention, the objects 714 and 718 are excluded from a process in which at least one menu is hidden. Therefore, the objects 714 and 718 are not hidden even when at least one menu is hidden as shown in screen (b), and thus the user can execute the objects 714 and 718. As shown in screen (b), a plurality of texts 720 to 726 are displayed (these were omitted in screen (a) for clarity, but it can be assumed the texts were generated prior to, or after, the generation of the menus of screen (a)). If objects 714 and 718 were never generated, then in order to change colors of the plurality of texts 702 to 726, the user could execute icons (for example, blue icon 712 and purple icon 716) corresponding to the lower menu item icons included in the third menu 710 of screen (a). However, as shown in screen (b), with the objects 714 and 718 already displayed, the user can change the colors of the plurality of texts via touch input on these objects, without the hierarchical touch operations otherwise required. That is, as shown in screen (c), when a touch on the first text 720 is detected by the controller immediately after a first object executing event for executing the first object 714 for performing the function of the blue icon 712 is detected by the controller, the controller can change the color of the first text to blue. Alternatively, the text 720 is first touched, then the object 714 is touched to automatically change the color of the text to blue.) Further, as shown in screen (d), when a touch on the second text 722 is detected by the controller immediately after a second object executing event for executing the second object 718 for performing the function of the purple icon 716 is detected by the controller, the controller can change the color of the second text to purple. Alternatively, the text 722 is touched first, then the object 718 is touched to change the text color to purple.

Accordingly, with the present embodiment as illustrated in FIG. 11, color change operations can be performed using a smaller number of touches. For instance, without the second object generation technique of FIG. 11 to generate objects such as 714, 718, in order to change plural colors of the texts to other plural colors, the user would need to touch the text and then also perform up to three additional touch inputs to pull down the desired color menus. When colors of ten text units are changed to other colors, this would require thirty or more additional touches. With the approach of FIG. 11, the number of touches required to achieve the same result is significantly reduced.

Figure 12:
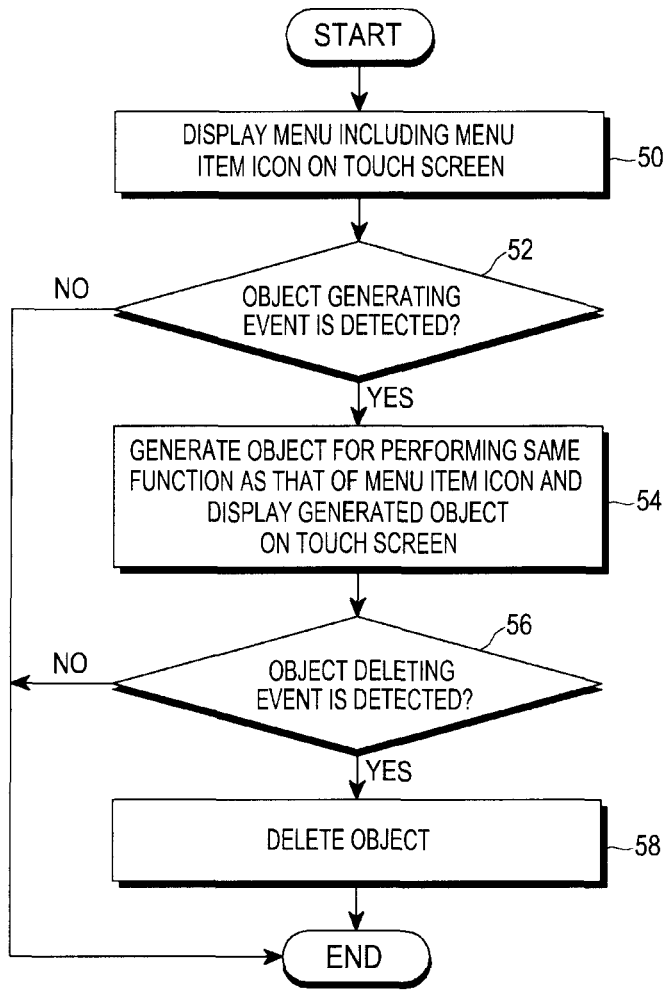
FIG. 12 is a flowchart of a menu displaying method in a mobile device according to an embodiment of the present invention.
Figure 13:
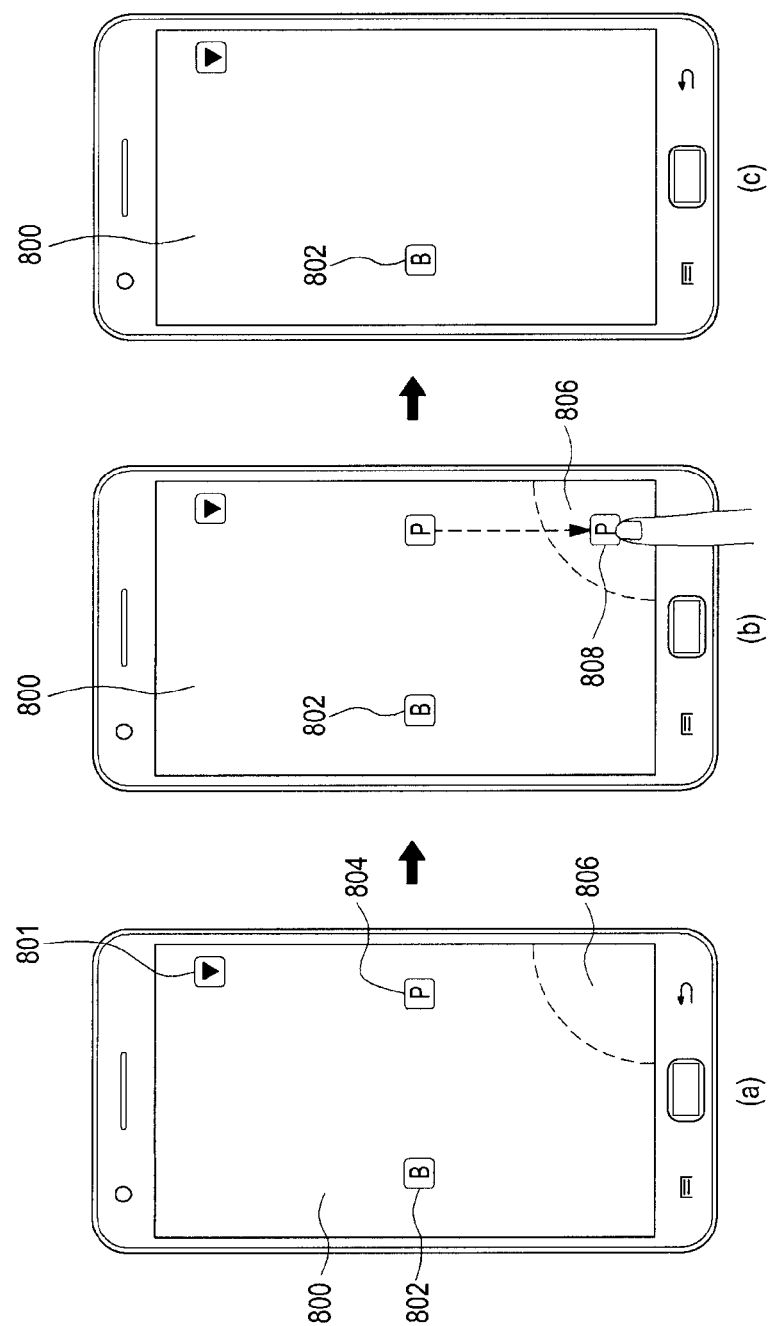
FIG. 13 depicts screen examples illustrating an execution of a menu displaying method in a mobile device according to an embodiment of the present invention.
Figure 14:
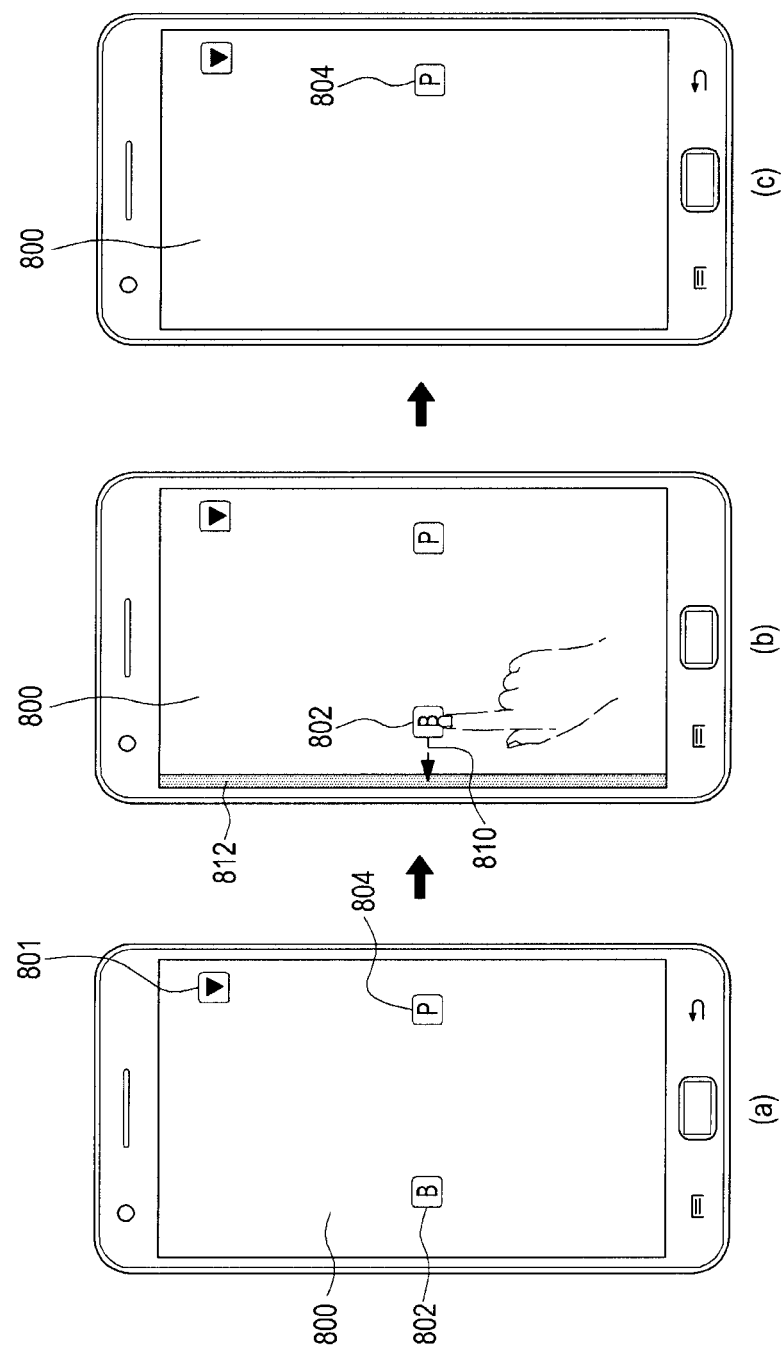
FIG. 14 depicts screen examples illustrating an execution of a menu displaying method in a mobile device according to an embodiment of the present invention.

FIG. 12 is a flowchart of a menu displaying method in a mobile device according to an embodiment of the present invention. FIGS. 13 and 14 show screen examples illustrating the method.

In this method, at least one menu including menu item icons on a touch screen 800 are first displayed in step 50. Next, an object generating event is detected for one or more menu item icons from the at least one displayed menu (step 52). When the object generating event is detected, an object for performing the same function as that of the one or more menu item icons is generated and displayed (step 54). Steps 50 to 54 are equivalent to steps 10 to 14 described in FIG. 2 so their detailed descriptions will be omitted. In the example of FIG. 13, two objects 802 and 804 are generated, in a manner similar to that described and shown for the color changing objects 714, 718 in screen (a) of FIG. 11.

With the at least one generated object thus displayed, it may be easily removed by the user in accordance with the embodiment. To this end, at step 56, of the controller detects whether an object deleting event for deleting the object has occurred. The object deleting event refers to an event for deleting the object from the touch screen, e.g., by dragging or flicking the object to a predetermined recycle bin area. The object deleting event may alternatively or additionally be a different type of predetermined touch input on the object, e.g., a tap, multi-tap, long touch, or certain type of drag.

Referring to FIG. 13, screens (a) to (c), a first object 802, a second object 804, and a menu hiding icon 801 are displayed on the touch screen 800. Further, the controller 110 can allocate a predetermined recycle bin area 806 to the touch screen 800. The predetermined recycle bin area 806 may be predetermined by the controller 110 of the mobile device, or may be determined by the controller 110 after reception of a user's input. Further, the controller 110 can display an indicator or an area indication for indicating the predetermined recycle bin area 806 allocated to the touch screen 800 on the touch screen 800. Furthermore, the object deleting event may be an event for dragging the object to the predetermined recycle bin area. That is, referring to screen (b) of FIG. 13, the object deleting event may be an event for dragging the second object 804 displayed on the touch screen 800 to the predetermined recycle bin area 806.

Further, referring to screen (a) of FIG. 14, the first object 802, the second object 804, and the menu hiding icon 801 are displayed on the touch screen 800. Further, the controller 110 can allocate a predetermined recycle bin area 812 to the touch screen 800. The predetermined recycle bin area 812 may be one or more sides of the touch screen 800, such as the left side 812 as shown in screen (b) of FIG. 14. The one or more sides of the touch screen corresponding to the predetermined recycle bin area 812 may be predetermined by the controller 110 of the mobile device, or may be determined by the controller 110 after reception of a user's input. Further, as shown in screen (b), the controller 110 can display an indicator or an area indication 812 for indicating the one or more sides of the touch screen corresponding to the predetermined recycle bin area on the touch screen 800. Furthermore, the object deleting event may be an event for flicking the object to the predetermined recycle bin area. That is, as shown in (b), the object deleting event may be an event 810 for flicking the first object 802 displayed on the touch screen 800 to the left side 812 of the touch screen.

Accordingly, at step 58, the object is deleted from the touch screen when the object deleting event is detected. For example, when the event for dragging 808 the second object 804 to the predetermined recycle bin area 806 is detected by the controller 110 as shown in (b) of FIG. 13, the controller 110 can delete the second object 804 from the touch screen 800 as shown in (c) of FIG. 13. Further, when the event for flicking 810 as shown in (b) of FIG. 14 is detected, the controller 110 can delete the first object 802 from the touch screen 800 as shown in (c) of FIG. 14.

The embodiments of the present invention can be implemented by hardware, software, or a combination of the hardware and the software. For example, certain software can be stored, regardless of possibility of omission or rewrite, in volatile or non-volatile storage devices such as a ROM, memories such as a RAM, a memory chip, a device or an integrated circuit, and optically or magnetically recordable and machine-readable storage media such as a CD, a DVD, a magnetic disk, a magnetic tape, etc. Further, the embodiments of the present invention can be implemented by a computer or a portable terminal including a controller and a memory, and the memory is one example of a computer readable storage unit suitable for storing a program or programs including instructions for implementing the embodiments of the present invention. Therefore, the present invention may include a program including code in order to implement the system or the method stated in certain claims of the specification, and the machine-readable storage media, which store such a program. Further, the program can be electronically transferred by certain media such as a communication signal transmitted through a wired or wireless connection, and the present invention appropriately includes equivalent matters.

Further, the mobile device can receive the program from a program providing apparatus connected through wired or wireless communication, and store the received program. The program providing apparatus may include a program including instructions for performing the embodiments of the present invention, a memory for storing information required for the embodiments of the present invention, a communication unit for performing wired or wireless communication with the mobile device, and a controller for transmitting a corresponding program to a transceiver automatically or by a request of the mobile device.

While the invention has been shown and described with reference to certain exemplary embodiments thereof, it shall be understood that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method of displaying a menu in a mobile device, the method comprising:
    detecting a first user input for at least one menu item icon selected from at least one menu displayed on a touch screen, the at least one menu being associated with an application currently being executed in the mobile device and the at least one menu item icon being associated with a specific function of the application;
    in response to detecting, through the touch screen, the first user input, displaying an object that is additionally displayed separately from the selected at least one menu item icon;
    after displaying the object, removing the at least one menu and detecting, through the touch screen, a second user input on the object, the object being configured to perform an equivalent function to that of the selected at least one menu item icon; and in response to detecting the second user input, performing the equivalent function of the application.

2. The method as claimed in claim 1, wherein a position of the object is changeable by dragging or flicking on the touch screen.

3. The method as claimed in claim 1, further comprising:
   detecting a sub object generating event for the object; and
   when the sub object generating event is detected, generating and displaying a sub object for performing a sub function of the specific function.

4. The method as claimed in claim 3, wherein the sub function is a function of a lower menu item icon of the selected at least one selected menu item icon corresponding to the object.

5. The method as claimed in claim 1, wherein the removing the at least one menu comprises:
   detecting a touch on a menu hiding icon for temporarily hiding the at least one menu displayed on the touch screen; and
   when the touch is detected, removing the at least one menu while displaying the object on the touch screen.

6. The method as claimed in claim 5, further comprising:
   detecting a touch on a menu return icon for returning the at least one menu; and
   when the touch is detected, displaying at least one menu on the touch screen.

7. The method as claimed in claim 1, further comprising:
   detecting an object deleting event for deleting the object; and
   when the object deleting event is detected, deleting the object from the touch screen.

8. The method as claimed in claim 7, where the object deleting event is a dragging or a flicking of the object to a predetermined recycle bin area.

9. The method of claim 1, wherein the object remains displayed on the touch screen in absence of user input on the touch screen.

10. The method of claim 1, wherein the detecting the first user input comprises:
    detecting a touch on the at least one menu item icon; and
    detecting a release of the touch.

11. An apparatus for displaying a menu in a mobile device, the apparatus comprising:
    a touch screen configured to display a screen of the mobile device; and
    a controller configured to:
       detect a first user input for at least one menu item icon selected from at least one menu displayed on the touch screen, the at least one menu being associated with an application currently being executed in the mobile device and the at least one menu item icon being associated with a specific function of the application,
       in response to detecting, through the touch screen, the first user input, display an object that is additionally displayed separately from the selected at least one menu item icon, and
       after displaying the object, remove the at least one menu and detect, through the touch screen, a second user input on the object, the object being configured to perform an equivalent function to that of the selected at least one menu item icon, and
       in response to detecting the second user input, perform the equivalent function of the application.

12. The apparatus as claimed in claim 11, wherein a position of the object is changeable by dragging or flicking on the touch screen.

13. The apparatus as claimed in claim 11, wherein the controller detects a sub object generating event for the object, and generates a sub object for performing a sub function of the specific function of the application and displays the generated sub object on the touch screen when the sub object generating event is detected.

14. The apparatus as claimed in claim 13, wherein the sub function is a function of a lower menu item icon of the at least one menu item icon corresponding to the object.

15. The apparatus as claimed in claim 11, wherein the controller detects a touch on a menu hiding icon for temporarily hiding the at least one menu displayed on the touch screen, and removes the at least one menu while displaying the object on the touch screen when the touch is detected.

16. The apparatus as claimed in claim 15, wherein the controller detects a touch on a menu return icon for returning the at least one menu temporarily hidden from the touch screen, and displays the at least one menu on the touch screen when the touch is detected.

17. The apparatus as claimed in claim 11, wherein the controller detects an object deleting event for deleting the object, and deletes the object from the touch screen when the object deleting event is detected.

18. The apparatus as claimed in claim 17, where the object deleting event is a dragging or a flicking of the object to a predetermined recycle bin area.

19. A mobile terminal comprising:
    a touch screen configured to display a screen of the mobile terminal; and
    a controller configured to:
       detect a first user input for at least one menu item icon selected from at least one menu displayed on the touch screen, the at least one menu being associated with an application currently being executed in the mobile terminal and the at least one menu item icon being associated with a specific function of the application, and
       in response to detecting, through the touch screen, the first user input, display an object that is additionally displayed separately from the selected at least one menu item icon,
       after displaying the object, remove the at least one menu and detect, through the touch screen, a second user input on the object, the object being configured to perform an equivalent function to that of the selected at least one menu item icon, and
       in response to detecting the second user input, perform the equivalent function of the application.

* * * * *